Patented Nov. 13, 1945

2,388,886

UNITED STATES PATENT OFFICE 2,388,886

N-SEC-BUTYL-p-NITROANILINE

Harold Von Bramer and Lee G. Davy, Kingsport, Tenn., assignors to Eastman Kodak Company, Rochester, N. Y., a corporation of New Jersey No Drawing. Application July 7, 1943, Serial No. 493,761

1 Claim. (Cl. 260—577)

This invention relates to N-sec-butyl-p-nitroaniline.

We have found that N-sec-butyl-p-nitroaniline can be prepared by condensing p-chloronitrobenzene with sec-butyl amine, in the presence of an alkali metal dichromate. This compound is of great utility, we have found, as an intermediate in the preparation of N,N'-di-sec-butyl-p-phenylenediamine. (See our copending application, Serial No. 493,762 filed of even date herewith, now U. S. Patent 2,381,015, dated August 7, 1945.)

It is an object of our invention to provide the new compound, N-sec-butyl-p-nitroaniline. Other objects will become apparent hereinafter.

In accordance with our invention, we prepare N-sec-butyl-p-nitroaniline by condensing p-chloronitrobenzene with sec-butyl amine, in the presence of a dichromate, such as potassium dichromate. Following are the details of the preparation of the new compound as well as a description of the compound: a steam jacketed steel autoclave was charged with

| | Grams |
|---|---|
| p-Nitrochlorobenzene | 236.4 |
| Sec-butyl amine | 328.0 |
| Water | 109.0 |
| Potassium dichromate | 1.0 |

The autoclave was closed and the temperature of the contents was raised to 185° C. and maintained there for eight hours. The reaction mixture was then removed from the autoclave and agitated with 60 grams of sodium hydroxide dissolved in 150 grams of water. The excess sec-butyl amine was distilled from this mixture, under a heavy reflux. The still residue separated into two layers, a lower aqueous layer and an upper oily layer. The layers were separated and the oily layer dried under vacuum (28 inches of mercury) for 3 to 4 hours. The oily layer was then distilled. The fraction distilling below 140° C. at 0.25 mm. of mercury pressure amounts to 18.2 grams. 265.6 grams (91.2 per cent yield) distilled from 140° C. and 145° C. at 0.25 mm. 8.3 g. of residue remained in the still. The 265.5 grams of liquid was N-sec-butyl-p-nitroaniline having the following formula:

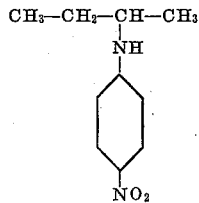

The compound is a dark brown, odorless, viscous liquid at ordinary temperatures (20°–25° C.). When cooled to −25° C., it solidified to a glass-like amorphous solid. On rewarming it began to soften at −35° C. and became liquid at −25° C. It boiled at 140° to 145° C. at 0.25 to 0.3 mm. of mercury pressure. It has a specific gravity of 1.105. It is soluble in diethyl ether, in acetone, in benzene, in ethyl alcohol, and only very slightly soluble in hot water.

What we claim as our invention and desire to be secured by Letters Patent of the United States is:

N-sec-butyl-p-nitroaniline.

HAROLD VON BRAMER.
LEE G. DAVY.